C. C. RICH.
HYDRAULIC TRANSMISSION MECHANISM.
APPLICATION FILED JULY 23, 1910.
1,156,817. Patented Oct. 12, 1915.
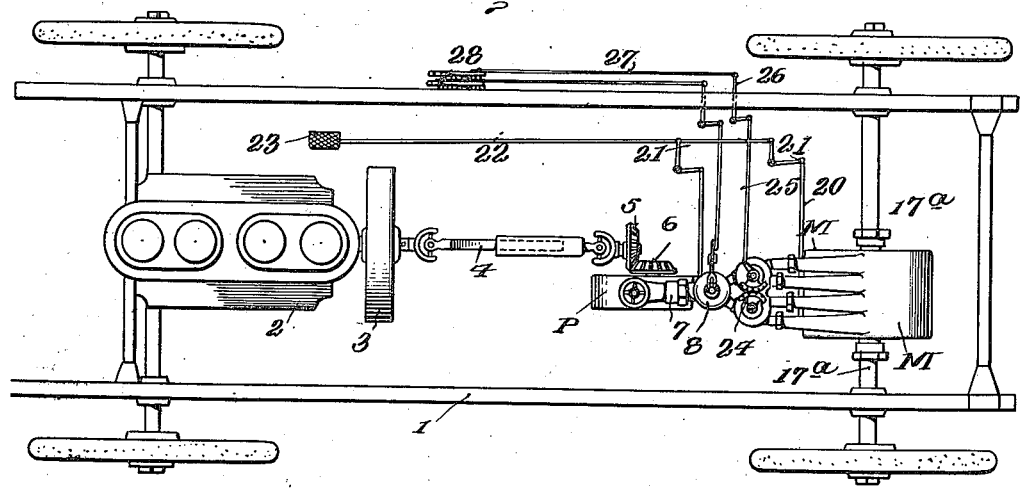
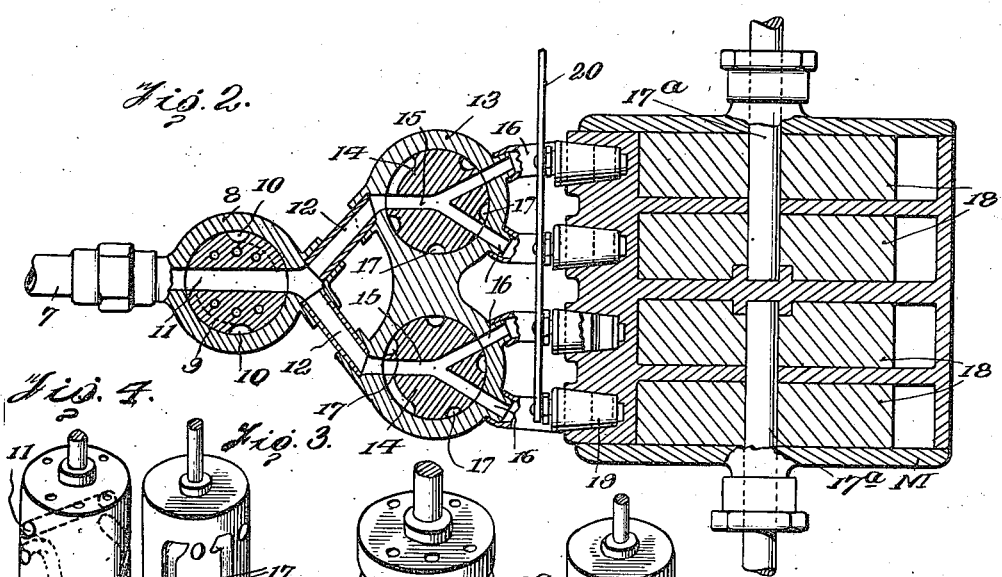
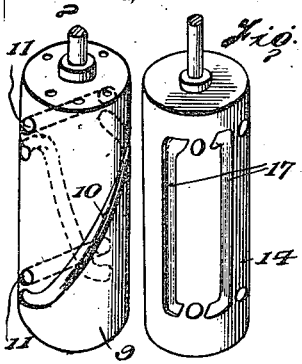
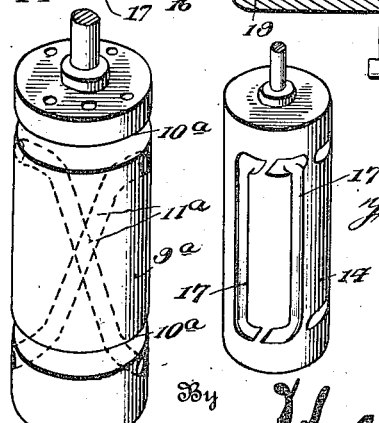
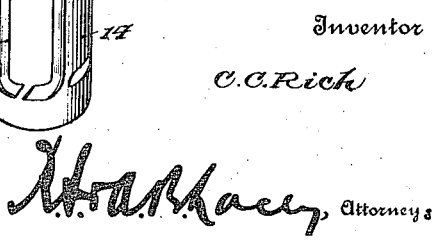

UNITED STATES PATENT OFFICE.

CHARLES C. RICH, OF MOUNT VERNON, NEW YORK, ASSIGNOR TO THE HYDRO-KINETIC TRANSMISSION COMPANY, OF MOUNT VERNON, NEW YORK, A CORPORATION OF MAINE.

HYDRAULIC TRANSMISSION MECHANISM.

1,156,817.  Specification of Letters Patent.  Patented Oct. 12, 1915.

Application filed July 23, 1910. Serial No. 573,567.

*To all whom it may concern:*

Be it known that I, CHARLES C. RICH, citizen of the United States, residing at Mount Vernon, in the county of Westchester and State of New York, have invented certain new and useful Improvements in Hydraulic Transmission Mechanism, of which the following is a specification.

This invention comprehends certain new and useful improvements in hydraulic transmission mechanism (Case D) and is designed particularly for use in connection with motor vehicles of the light type, in contra-distinction to motor trucks, warehouse vehicles and the like, although it is to be understood that my invention is applicable also for use wherever it is desired to transmit power from a drive to a driven shaft.

The present invention has for its primary object an improved construction of fluid transmission mechanism embodying a pair of duplex motors connected respectively to the two sections of the rear axle of an automobile, or to the sections of another driven shaft, each of said hydraulic motors including a pair of rotors in connection with valve mechanism which is so arranged that the motive fluid may be passed to and from a pumping mechanism to all of the rotors simultaneously or to and from a single rotor of each motor in the set, the operation of the motors and their location upon each axle of the vehicle doing away with the necessity of the ordinary differential mechanism, while at the same time, all of the parts are closely coupled together, and all piping practically eliminated, the structure being rigid, and reducing vibration to a minimum.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings in which:—

Figure 1 is a plan view of an automobile framework or running gear illustrating the same conventionally, and showing particularly the disposition of my improved hydraulic mechanism, and its connection with the gasolene motor or other engine; Fig. 2 is an enlarged horizontal sectional view through the two duplex motors; and the single reversing valve that is interposed between the pumping mechanism and the speed controlling valves and which is common to both of the latter; Fig. 3 is a perspective view of one of the speed controlling valves; Fig. 4 is a similar view of one form of reversing valve that may be employed; Fig. 4ª is a similar view of another form of reversing valve; Fig. 5 is another view of one of the speed controlling valves.

Corresponding and like parts are referred to in the following description and indicated in all the views of the drawings by the same reference characters.

The numeral 1 designates the framework of a motor vehicle, 2 the internal combustion engine or other prime mover, 3 the fly wheel thereof, and 4 the transmission shaft of any desired construction or design. The shaft 4 carries at its rear end a bevel pinion 5 which meshes with a corresponding pinion 6 on the rotor shaft of a pump P, the pump being supported in any desired way in the framework 1. The inlet and outlet ports 7 of the pump P communicate with the interior of a cylinder 8 in which a piston 9 is mounted for a longitudinal movement. The cylinder 8 is provided at diametrically opposite points with ports between which communication is established by the grooves and passages formed in the piston 9. The grooves are designated 10 and extend obliquely in opposite directions around the periphery of the pistons as best illustrated in Fig. 4 and are designed, when in registry with the ports of the cylinder 8, to reverse the direction of flow of the motive fluid to and from the motors M, to cause the vehicle to travel rearwardly. The passages 11 extend directly in a transverse direction through the piston near the ends thereof and serve to directly pass the motive fluid to and from the motors M so as to propel the vehicle in a forward direction. It will thus be seen that on the forward movement of the vehicle, where high speed is desirable, the fluid will pass directly through the piston 9, the more circuitous passages or grooves being only brought into play on the reverse, where high speed is not so essential and where it is not so necessary to eliminate friction. If desired, the piston illustrated in Fig. 4ª and designated 9ª may be employed, the same being formed with circumferential grooves 10ª for the direct passage of the fluid on forward motion, and with crossed oblique passages 11ª extending therethrough for the purpose of reversing the flow of motive fluid.

From the hydraulic casing 8 of the reversing valve or piston 9 divergent passages 12 lead, said passages communicating with ports that are formed in two valve chambers, and in each of these chambers there is a selecting valve 14. Each of the valves 14 is formed with substantially Y-shaped passages 15 extending transversely therethrough, and arranged to register respectively with the divergent passages 12 and the passages 16 which lead to and from the respective compartments of the two duplex motors M. By this means, it is evident, that the motive fluid may pass from and to the pump P directly to all of the motors simultaneously, thereby distributing the force of said fluid and obtaining the maximum power of which the mechanism is capable, and at a relatively low speed. In addition to the Y-shaped passages 15, each of the valves 14 is formed with longitudinally extending grooves 17 sundry of which are designed to bridge the upper and lower passages 12 and the outlet and inlet passages 16 of the respective motors in a certain position of the valves so as to permit the pump to run and the motors also to run through the inertia of the machine, without any operative connection between the pumping mechanism and the motors. It is also to be understood that by turning both the valves 14 to another position, the outlet and inlet passages of one motor of each pair may be directly connected with each other but shut off from the pump so as to permit the motors to run free while the remaining motors (say those nearest to the work), receive the full force of the motive fluid, the maximum speed being thereby attained without any unnecessary lateral, or torsional strains being imposed upon the axle sections 17ª to which the rotors 18 of each duplex motor are keyed or otherwise rigidly connected. For a further and detail description of the specific construction of speed controlling and reversing valves, reference is to be had to my companion applicatoin Serial No. 573,566, filed July 23, 1910, and (Case C) executed of even date herewith.

The present embodiment of the invention illustrates (which is also more specifically described in my companion application, just referred to), means whereby, without changing the position of the speed controlling valves 14, the entire motor set may be cut off from the pumping mechanism and the fluid permitted to circulate freely within the casings, said means embodying, as illustrated in Fig. 2, by-pass passages controlled by turn plugs or cocks 19 operated by a common link bar 20 which is operatively connected by a bell-crank 21 and link rod 22 to a foot treadle 23 located in convenient proximity to the driver's seat. Manifestly the two speed controlling valves 14 are simultaneously operated, the means for accomplishing this result being shown in the present instance as meshing segments 24 secured to the stems of the respective valves 14, one of said segments being connected by a link rod 25, bell crank 26, and link 27 to a hand lever 28 as best illustrated in Fig. 1.

From the foregoing description in connection with the accompanying drawing, the operation of my improved hydraulic transmission mechanism will be apparent. In the practical use of the device, the entire set of motors may be simultaneously operated by the single pump P to secure low speed, to propel the vehicle either ahead or rearwardly, according to the particular position of the piston valve 9, or by manipulating the hand lever 28, said speed controlling valves 14 may be so shifted as to entirely disconnect the motors from the pump and permit them both to run free and disconnected from each other, or by a still further shifting of the valves 14 the inner motor of each pair may be rendered inoperative, and the outer motor of each pair receive the full force of the motive fluid so as to increase the speed. Obviously, by manipulating the foot treadle 23, the by-pass passages may be opened up so as to permit the fluid to merely circulate within the casing and continuously flow in a uniformly circular path, thereby rendering the motors inoperative without shifting the speed controlling devices and also rendering it possible to again start the vehicle without any necessity of touching or manipulating the speed controlling valves, or of having them in the neutral position.

Having thus described the invention, what is claimed as new is:

1. In hydraulic transmission mechanism, the combination of a pair of duplex motors, shaft sections to which the rotors of said motors are respectively connected, speed controlling valves arranged to control the inlet and outlet ports of all of the motors simultaneously or of one part of each duplex motor independently of the other, a reversing valve mechanism co-acting with said speed controlling valves, means for operating the speed controlling valves, means for operating the reversing valve mechanism, a pump operatively connected to the motors through the speed controlling valves and reversing valve mechanism, and means for actuating said pump.

2. In hydraulic transmission mechanism, the combination of a pair of duplex motors, shaft sections to which the rotors of said duplex motors are connected respectively, a valve casing, a pair of speed controlling valves mounted in said casing and arranged to open the inlet and outlet ports of all of the motors simultaneously, or of one part of each duplex motor independently of the other, a reversing valve mechanism including a cylinder operatively connected to said valve casing and arranged to pass the motive fluid to and from the same, a single pump the outlet and inlet portions of which are connected to the cylinder, the cylinder and reversing valve forming a part thereof being interposed between the pump and both of said speed controlling valves and serving both of the latter, means for simultaneously moving said speed controlling valves, and means for actuating said pump.

3. In hydraulic transmission mechanism of the character described, the combination of a pump, a motor, a speed controlling valve interposed between the motor and pump, and a reversing valve interposed between the speed controlling valve and the pump and embodying a piston formed with straight transverse passages extending therethrough and with oppositely extending oblique peripheral grooves, said passages being adapted to pass the fluid from and to the pump and motor in a direction to propel the motor forwardly, and the grooves being arranged to change the direction of flow from the valve and motor rearwardly.

4. In hydraulic transmission mechanism, the combination of a pair of duplex motors including each two rotors, shaft sections to which the rotors of said motors are respectively connected, a pump, means for operating the pump, selecting valves whereby the motive fluid may be directed to both of the rotors of each pair or to only one of said rotors, said selecting valves being arranged to connect the inlet and outlet ports of the motors with each other and thereby disconnect the motors from the pump, a reversing valve mechanism interposed between the pump and the selecting valves and the motors, means for actuating the selecting valves, means for actuating the reversing valve mechanism, the motors being formed with by-pass openings whereby to connect the inlet and outlet ports of the motors with each other independently of the selecting valves, and means for simultaneously operating the valves in said by-passes.

5. In hydraulic transmission mechanism, the combination of a pair of duplex motors including each two rotor shaft sections to which the shaft sections of said motors are respectively connected, a pump, means for operating the pump, means whereby the outlet and inlet ports of the pump may be connected directly to the outlet and inlet ports of the several motors or to the outlet and inlet ports of one motor of each pair of rotors, said means also being arranged to connect the inlet and outlet ports with each other and thereby disconnect said outlet and inlet ports from the pump, a reversing valve mechanism interposed between the pump and the motors, and means for connecting the inlet and outlet ports of each motor together to thereby disconnect said ports from the pump and allow the motors to operate independently of the pump.

6. In hydraulic transmission mechanism of the character described, the combination of a pump, a motor, a speed controlling valve interposed between the motor and the pump, and a reversing valve interposed between the speed controlling valve and the pump and embodying a piston formed with transverse passages disposed in planes at right angles to the axis of the piston and with oppositely extending oblique passages, the first named passages being adapted to pass the fluid from and to the pump and motor in a direction to propel the motor forward and the second named passages being arranged to reverse the direction of flow from the valve and motor.

7. In hydraulic transmission mechanism, the combination of a pair of duplex motors, each motor having an inlet and an outlet port, independent shaft sections to which the rotors of said motors are respectively connected, a speed-controlling valve chamber disposed opposite each duplex motor and having inlet and outlet ports connected to the inlet and outlet ports of the corresponding motor, a single reversing valve chamber having a pair of inlet ports and outlet ports, the outlet ports of the reversing valve chamber being connected each to the inlet port of one of the speed controlling valve chambers, rotatable valves disposed in the speed-controlling valve chambers and having Y-shaped passages therethrough, each valve being movable to a position to entirely cut off communication between the pump and both of the motors controlled by said valve, or cut off communication between one of said motors and the pump, and a reversing valve disposed in the reversing valve chamber having ports therethrough adapted when the valve is shifted in one position to connect the outlet port of the pump with the inlet ports of the controlling valve chambers and the inlet port of said pump with the other ports in said controlling valve chambers, or to reverse said connection.

8. In a hydraulic transmission mechanism, the combination with pumping mechanism, of a plurality of pairs of hydraulic motors, means for directing the fluid in one direction through both the motors of each pair, or through one motor of each pair, and means for reversing the direction of movement of the flow through said motors.

In testimony whereof, I affix my signature in presence of two witnesses.

CHARLES C. RICH. [L. S.]

Witnesses:
 W. N. WOODSON,
 FREDERICK S. STITT.